United States Patent
Gerdes et al.

(10) Patent No.: US 9,505,389 B2
(45) Date of Patent: Nov. 29, 2016

(54) POWER-ASSISTED BRAKING SYSTEM FOR A VEHICLE AND METHOD FOR CONTROLLING THE POWER-ASSISTED BRAKING SYSTEM

(75) Inventors: Manfred Gerdes, Vaihingen/Enz (DE); Jochen Mayer, Giengen an der Brenz (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 13/877,008

(22) PCT Filed: Aug. 1, 2011

(86) PCT No.: PCT/EP2011/063236
§ 371 (c)(1),
(2), (4) Date: Jun. 11, 2013

(87) PCT Pub. No.: WO2012/041570
PCT Pub. Date: Apr. 5, 2012

(65) Prior Publication Data
US 2013/0278048 A1    Oct. 24, 2013

(30) Foreign Application Priority Data
Sep. 29, 2010  (DE) .................. 10 2010 041 642

(51) Int. Cl.
*B60T 13/14*  (2006.01)
*B60T 8/40*  (2006.01)
(Continued)

(52) U.S. Cl.
CPC .............. *B60T 13/142* (2013.01); *B60T 8/404* (2013.01); *B60T 8/405* (2013.01); *B60T 8/441* (2013.01); *B60T 13/148* (2013.01); *B60T 13/662* (2013.01); *B60T 13/686* (2013.01); *B60T 17/02* (2013.01)

(58) Field of Classification Search
CPC .. B60T 13/143; B60T 13/145; B60T 13/146; B60T 8/441
USPC ............. 303/155, 115.2, 115.4, 115.5, 114.1
See application file for complete search history.

(56) References Cited

U.S. PATENT DOCUMENTS 6,206,489 B1 * 3/2001 Schmidt et al. ......... 303/122.08
6,290,307 B1   9/2001 Poertzgen et al.
(Continued)

FOREIGN PATENT DOCUMENTS

DE   197 03 776   8/1998
DE   103 18 850   11/2004
(Continued)

OTHER PUBLICATIONS

International Search Report, PCT International Application No. PCT/EP2011/063236, dated Oct. 21, 2011.

*Primary Examiner* — Bradley King
(74) *Attorney, Agent, or Firm* — Norton Rose Fulbright US LLP; Gerard Messina

(57) ABSTRACT

A power-assisted braking system for a vehicle is described, including: a brake master cylinder having a chamber which is hydraulically connected to a wheel brake cylinder for braking a wheel of the vehicle; a hydraulic actuator which activates a piston of the brake master cylinder in order to pressurize the hydraulic fluid in the chamber; a low-pressure accumulator which stores the hydraulic fluid under pressure, and the actuator for activating the piston of the brake master cylinder; a pump which supplies the hydraulic fluid from the tank to the low-pressure accumulator; and a drive device which drives the pump. A method for controlling a power-assisted braking system is also described.

18 Claims, 1 Drawing Sheet

(51) Int. Cl.
B60T 8/44 (2006.01)
B60T 13/66 (2006.01)
B60T 13/68 (2006.01)
B60T 17/02 (2006.01)

(56) References Cited

U.S. PATENT DOCUMENTS

| | | |
|---|---|---|
| 7,296,861 B2 | 11/2007 | Ohlig et al. |
| 2006/0033383 A1* | 2/2006 | Ohlig et al. .................. 303/15 |
| 2006/0091724 A1* | 5/2006 | Beck et al. ............... 303/114.1 |
| 2008/0018171 A1 | 1/2008 | Ohlig et al. |
| 2008/0236971 A1* | 10/2008 | Suzuki et al. ............... 188/358 |
| 2011/0146395 A1 | 6/2011 | Vollert et al. |

FOREIGN PATENT DOCUMENTS

| | | |
|---|---|---|
| DE | 10 2004 025 | 9/2005 |
| DE | 10 2008 041 | 2/2010 |
| EP | 0 607 451 | 7/1994 |
| JP | 59 128038 | 7/1984 |
| JP | 10-305770 | 11/1998 |
| JP | 2008-254466 | 10/2008 |
| WO | WO 94/01813 | 1/1994 |
| WO | WO 94/27848 | 12/1994 |
| WO | WO 97/18116 | 5/1997 |
| WO | WO 2004/005098 | 1/2004 |

* cited by examiner

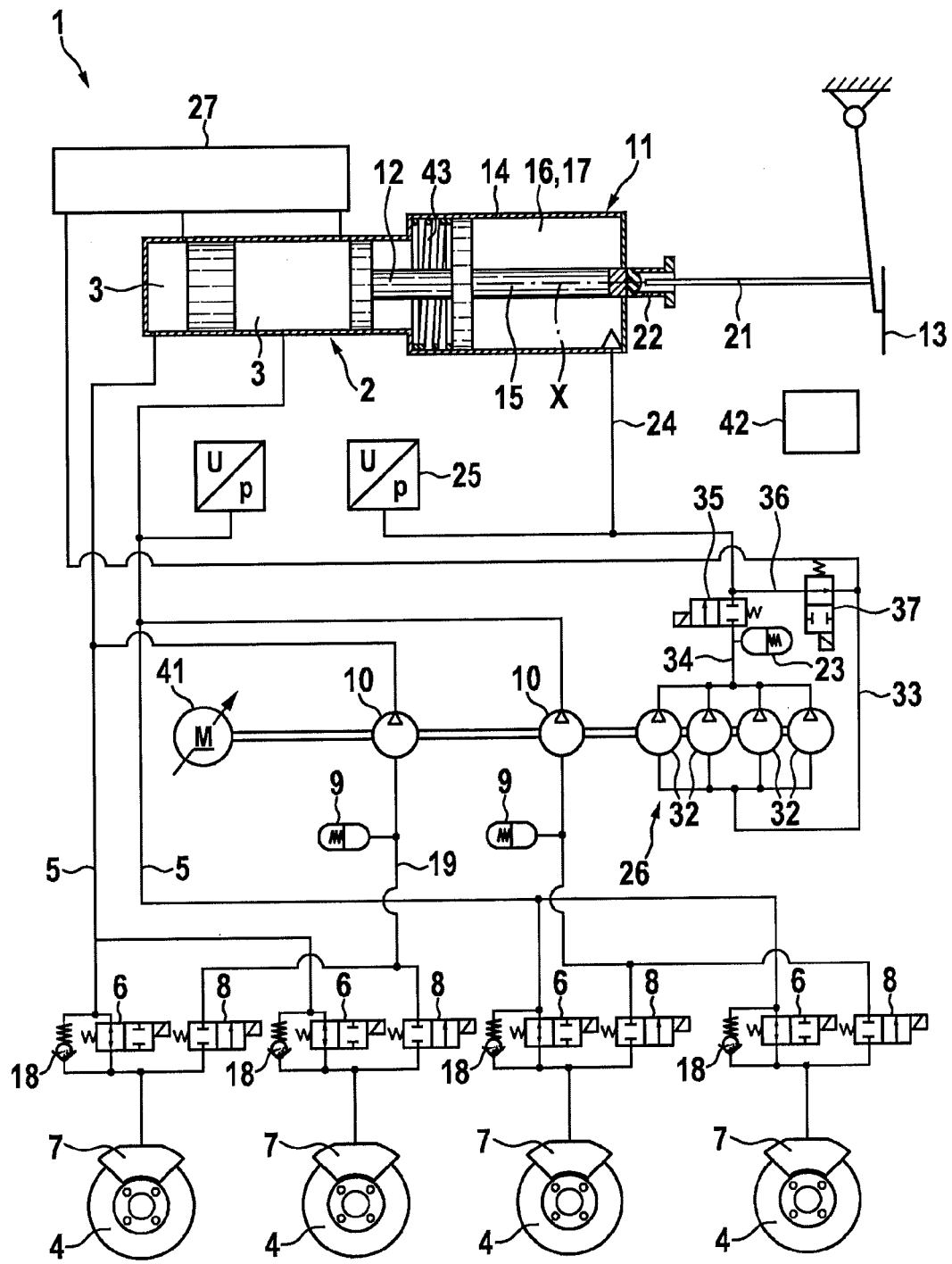

POWER-ASSISTED BRAKING SYSTEM FOR A VEHICLE AND METHOD FOR CONTROLLING THE POWER-ASSISTED BRAKING SYSTEM

FIELD

The present invention relates a braking system for a vehicle.

BACKGROUND INFORMATION

In braking systems for vehicles, a distinction is basically made between so-called power braking systems and power-assisted braking systems.

In power braking systems, the brake master cylinder, which is hydraulically connected to the wheel brake cylinders, is operated using hydraulic fluid for acting on the wheel brake cylinders without direct transfer of the driver's foot power to the brake master cylinder. Such a power braking system is described, for example, in German Patent Application No. DE 10 2004 025 638 A1.

In contrast, in power-assisted braking systems, a brake booster is used, which acts upon the brake master cylinder in addition to the driver's foot power for supplying hydraulic fluid to the wheel brake cylinders. Such a power-assisted braking system is described, for example, in German Patent No. DE 103 18 850 A1.

A conventional power-assisted braking system for a vehicle may have the following: a brake master cylinder having a chamber, which is hydraulically connected to a wheel brake cylinder for braking a wheel of the motor vehicle; a hydraulic actuator which activates a piston of the brake master cylinder in order to thus pressurize the hydraulic fluid in the chamber; a pressure accumulator which stores the hydraulic fluid under pressure, and the actuator for activating the piston of the brake master cylinder; a pump which supplies hydraulic fluid from a tank to the low-pressure accumulator; and a drive device which drives the pump.

SUMMARY

An example power-assisted braking system in accordance with the present invention may offer the advantage that a low-pressure accumulator is provided which stores hydraulic fluid under pressure, and supplies it to the actuator for activating the piston of the brake master cylinder. Such a low-pressure accumulator is relatively cost-effective and compact. The low-pressure accumulator supports the pump and the drive device driving it, in particular at times when the first pump is still unable to pump hydraulic fluid, since the inertia of the drive device has not yet been overcome.

A "low-pressure accumulator" is to be understood here as a pressure accumulator which stores a maximum pressure, which is much lower than the pressure needed at the actuator for fully decelerating the vehicle, and contains a maximum hydraulic volume, which is much smaller than the volume needed for completely filling the actuator.

BRIEF DESCRIPTION OF THE DRAWING

Exemplary embodiments of the present invention are depicted in the FIGURE and are explained in greater detail below.

The FIGURE schematically shows a braking system according to one exemplary embodiment of the present invention.

DETAILED DESCRIPTION OF EXAMPLE EMBODIMENTS

In the FIGURE, the same reference numerals denote the same elements or elements having the same function, unless otherwise indicated.

The FIGURE schematically shows a power-assisted braking system 1 according to one exemplary embodiment of the present invention.

Braking system 1 is preferably used in a motor vehicle not illustrated in detail.

Braking system 1 has a brake master cylinder 2 having two chambers 3, each of which is hydraulically connected to two wheel brake cylinders 7 with the aid of lines 5 for braking wheels 4 of the motor vehicle. Brake master cylinder 2 is preferably a tandem master cylinder (TMC). Each of lines 5 is connected to a wheel brake cylinder 7 with the aid of an inlet valve 6. Inlet valves 6 may be designed as 2/2-way valves, which are normally open, as shown in the FIGURE. Furthermore, return valves 18 are provided in parallel to inlet valves 6. Each of lines 5 may be branched in order to supply two wheel brake cylinders 7 with hydraulic fluid. Wheel brake cylinders 7 are furthermore connected to chamber 3 (for better understanding, subsequent embodiments refer only to the brake circuit shown on the left side of the FIGURE) via outlet valves 8, a low-pressure accumulator 9, a pump 10, and a line 19. Outlet valves 8 may be designed as 2/2-way valves, which are normally closed, as shown in the FIGURE. In an antilock mode of braking system 1, pump 10 pumps hydraulic fluid into chambers 3.

Braking system 1 furthermore has a hydraulic actuator 11, which activates a piston 12 of brake master cylinder 2 in order to thus pressurize hydraulic fluid in chambers 3. Hydraulic actuator 11 is designed here as a brake booster, which boosts a foot power exerted by the driver of the motor vehicle on piston 12 with the aid of a brake pedal 13. Therefore, this is a power-assisted braking system.

Actuator 11 has a cylinder 14, in which a piston 15 is guided. A chamber 16 formed between cylinder 14 and piston 15 receives hydraulic fluid 17 (see FIG. 1), displacing piston 15 longitudinally, which then acts upon piston 12 of brake master cylinder 2. A pedal rod 21 connects pedal 13 to piston 15. The driver thus may exert a force to piston 12 of brake master cylinder 2 independently of actuator 11, thus activating wheel brake cylinders 7. This is advantageous in particular in view of a possible failure of actuator 11.

A pedal sensor 22, situated, for example, between pedal rod 21 and piston 15, senses the pedal force exerted by the driver and thus his intent to brake. Sensor 22 and the underlying measurement principle may be provided, for example, as described in German Patent Application No. DE 10 2008 041 349 A1.

Furthermore, braking system 1 has a low-pressure accumulator 23, which stores hydraulic fluid under pressure and supplies it to actuator 11 for activating piston 12 of brake master cylinder 2.

Low-pressure accumulator 23 is designed, for example, as a piston accumulator. However, it is also possible to use another type of low-pressure accumulator. Low-pressure accumulator 23 is designed for providing a pressure, which is 5% to 30% lower than the pressure needed at actuator 11 (i.e., its chamber 16) for fully decelerating the vehicle and accepts a volume which is 5% to 30% smaller than the volume needed for completely filling actuator 11 (i.e., its chamber 16). Low-pressure accumulator 23 is hydraulically connected to chamber 16 of actuator 11 via a line 24. A pressure sensor 25 measures the pressure in line 24 and thus the pressure in chamber 16.

Braking system 1 further includes a pump 26, which supplies hydraulic fluid to low-pressure accumulator 23 from a tank 27. Pump 26 may in turn be composed of multiple, for example four, staggered individual pumps 32. This has the purpose of smoothing the pressure variation generated by pump 26. The suction side of pump 26 is hydraulically connected to tank 27 with the aid of a line 33 and its pressure side is hydraulically connected to low-pressure accumulator 23 with the aid of a line 34. Line 34 is connected to line 24 with the aid of a first control valve 35, i.e., first control valve 35 connects low-pressure accumulator 23 and the pressure side of pump 26 to chamber 16 of actuator 11. First control valve 35 may be designed, for example, as a 2/2-way valve, which is normally closed, as the FIGURE shows. In addition, a line 36 and a second control valve 37 connect line 24 to line 33, i.e., second control valve 37 connects chamber 16 of actuator 11 to tank 27. Second control valve 37 may be designed, for example, as a 2/2-way valve, which is normally open, as the FIGURE shows.

Pump 26 is driven by a drive device in the form of an electric motor 41. Electric motor 41 drives pump 26 to supply hydraulic fluid to chamber 16 of actuator 11, during a braking period, i.e., when wheel brake cylinders 7 should be actuated. In this case, first control valve 35 is open and second control valve 37 is closed. The hydraulic fluid then flows from pump 26 through control valve 35 into chamber 16, ultimately activating wheel brake cylinders 7. Furthermore, an electronic control unit (ECU) 42 of braking system 1 may be configured to control second control valve 37 in such a way that pressure fluctuations occurring during the operation of pump 26 are smoothed. This is accomplished by briefly opening second control valve 37, thus releasing pressure peaks to tank 27.

At the end of the above-described braking period, no more power is supplied to electric motor 41. Due to its inertia, electric motor 41 has an overrun. This overrun is used for driving first pump 26, thus filling low-pressure accumulator 23. For this purpose, first control valve 35 is closed at the beginning of the overrun. This is energy-efficient. In addition, no additional pump is thus needed for filling low-pressure accumulator 23.

In addition, pump 26 may fill low-pressure accumulator 23 during a braking system function test period. A "function test period" is understood here as a state of the braking system in which its functionality is tested. A corresponding function test is typically performed in motor vehicles before and/or after start-up of the internal combustion engine. Activating electric motor 41 and thus pump 26 is part of such a function test. The hydraulic fluid pumped during this test is stored in low-pressure accumulator 23. First control valve 35 is closed for this purpose.

To generate maximum braking torque, control unit 42 controls first control valve 35 and pump 26 in such a way that, at the end of the pressure build-up phase, pump 26 generates most, i.e., more than 50%, preferably more than 70%, of the hydraulic fluid pressure present in chamber 16. The smaller portion, i.e., less than 50%, or less than 30%, of the pressure is generated by low-pressure accumulator 23. For example, at the end of the pressure build-up phase, low-pressure accumulator 23 still generates a pressure of 10 bar, while pump 26 generates a pressure of 60 bar. However, at the beginning of the pressure build-up phase, low-pressure accumulator 23 generates a pressure of 20 bar, for example, while pump 26 generates virtually no pressure. In particular at the beginning of the pressure build-up phase, while pump 26 is not yet generating any relevant pressure due to the inertia of electric motor 41, low-pressure accumulator 23 supports the driver by opening first control valve 35 and thus supplying hydraulic fluid from low-pressure accumulator 23 to chamber 16.

For better understanding, a braking cycle is briefly explained below:

The driver, by stepping on brake pedal 13, directly deflects pedal sensor 22. Due to this signal, first control valve 35 is energized, i.e., opened, and second control valve 37 is energized, i.e., closed. Electric motor 41 is also energized if it was not energized previously. The hydraulic fluid thus present in chamber 16 of actuator 11 activates brake master cylinder 2, in conjunction with the driver's foot power, whereby a brake pressure is built up in lines 5 and thus in wheel brake cylinders 7.

If now the driver no longer presses the pedal, his braking intent, which is sensed by pedal sensor 22, remains constant. The power supplied to pump 26 is subsequently reduced, i.e., the pump power is reduced, and the pressure no longer rises. As a function of the present pressure, second control valve 37 is then measured with the aid of pressure sensor 25 and switched to the pressure control function, i.e., the power supplied to second control valve 37 is reduced to the point where the pressure in chamber 16 of actuator 11 is kept approximately constant. If the driver further presses brake pedal 13, second control valve 37 receives more power as long as first pump 26 is capable of further increasing the pressure present in chamber 16. Brief pressure increases due to the above-described pressure fluctuations of pump 26 are counteracted by further opening second control valve 37, which is in turn accomplished by control unit 42 activating the valve; the pressure peaks are thereby considerably weakened and are no longer perceptible by the driver. The pressure peaks are also reduced by low-pressure accumulator 23, which elastically absorbs them.

If the driver removes his foot from brake pedal 13, this is detected by pedal sensor 22, and the power supplied to second control valve 37 and pump 26 is reduced. First control valve 35 is closed. The residual pressure remaining in low-pressure accumulator 23 is used for the next braking. Due to the dropping pressure in chamber 16, a spring 43 of actuator 11 and the pressure in lines 5 move pistons 12, 15, and thus also brake pedal 13, back into their starting position.

Although the present invention is described above with reference to preferred exemplary embodiments, it is not limited thereto, but may be modified in many ways. The refinements and exemplary embodiments of the power-assisted braking system according to the present invention apply accordingly to the method according to the present invention. It is also pointed out that "one" does not exclude "multiple" here.

What is claimed is:

1. A power-assisted braking system for a vehicle, comprising:
   a brake master cylinder having a chamber, which is hydraulically connected to a wheel brake cylinder for braking a wheel of the vehicle;
   a hydraulic actuator which activates a piston of the brake master cylinder to pressurize hydraulic fluid in the chamber, wherein the hydraulic actuator is a brake booster, which boosts a force mechanically exerted by the driver on the piston of the brake master cylinder;

a pressure accumulator, which stores hydraulic fluid under pressure and supplies it to the actuator for activating the piston of the brake master cylinder;

a pump which supplies hydraulic fluid to the pressure accumulator from a tank; and a drive device which drives the pump;

wherein the pressure side of the pump is hydraulically connected to a first control valve and the pressure accumulator, and the first control valve is further hydraulically connected to the actuator, wherein the tank is hydraulically connected to the actuator with the aid of a second control valve, and a control unit is provided which opens the first control valve to generate a braking torque to supply the actuator with hydraulic fluid and simultaneously controls the second control valve for smoothing the pressure fluctuations occurring during the operation of the pump;

wherein the pressure accumulator stores a maximum pressure, which is lower than the pressure needed at the hydraulic actuator for fully decelerating the vehicle, and has a maximum hydraulic volume, which is smaller than the volume needed for completely filling the hydraulic actuator; and wherein the drive device is an electric motor configured to drive the pump for supplying hydraulic fluid to the actuator during a braking period, and the pump fills the pressure accumulator during an overrun of the electric motor following the braking period, wherein the wheel brake cylinder is connected to the chamber via another pump, wherein in an antilock mode, the another pump pumps the hydraulic fluid into the chamber, and wherein the pump and the another pump are both operated by the electric motor.

2. The braking system as recited in claim 1, wherein the pressure accumulator stores a pressure, which is 5% to 30% lower than the pressure needed at the actuator for fully decelerating the vehicle, and contains a maximum hydraulic volume which is 5% to 30% smaller than the volume needed for completely filling the actuator.

3. The braking system as recited in claim 1, wherein the pump fills the pressure accumulator during a braking system function test period.

4. The braking system as recited in claim 1, wherein the control unit controls at least one of the first control valve, the second control valve, and the drive device of the pump for generating a maximum braking torque so that, at the end of the pressure build-up phase, the pump generates most of the hydraulic fluid pressure at the actuator.

5. The braking system as recited in claim 1, wherein to generate a maximum braking torque, the control unit controls the first control valve and the pump so that, at the end of a pressure build-up phase, the pump generates a larger portion of the hydraulic fluid pressure present in the chamber, and wherein a smaller portion of the pressure is generated by the pressure accumulator.

6. The braking system as recited in claim 1, wherein to generate a maximum braking torque, the control unit controls the first control valve and the pump so that, at the end of a pressure build-up phase, the pump generates a larger portion, which is more than 50%, of the hydraulic fluid pressure present in the chamber, and wherein a smaller portion, which is less than 50%, of the pressure is generated by the pressure accumulator.

7. The braking system as recited in claim 1, wherein to generate a maximum braking torque, the control unit controls the first control valve and the pump so that, at the end of a pressure build-up phase, the pump generates a larger portion, which is more than 70%, of the hydraulic fluid pressure present in the chamber, and wherein a smaller portion, which is less than 30%, of the pressure is generated by the pressure accumulator.

8. The braking system as recited in claim 1, wherein the pressure accumulator supports the pump, including during starting of the pump when the pump is not yet fully functional, and wherein a main contribution of the pressure build-up comes from the pump and the pressure accumulator only provides a minor contribution of the pressure build-up.

9. A method for controlling a power-assisted braking system for a vehicle, comprising:

supplying hydraulic fluid to a pressure accumulator with the aid of a pump; and supplying hydraulic fluid from the pressure accumulator to an actuator, wherein the actuator is a brake booster, which boosts a force mechanically exerted by the driver on the piston of the brake master cylinder, and activating a piston of a brake master cylinder with the aid of the actuator to supply hydraulic fluid to a wheel brake cylinder from a chamber of the brake master cylinder to brake a wheel of the vehicle;

wherein the pressure side of the pump is hydraulically connected to a first control valve and the pressure accumulator, and the first control valve is further hydraulically connected to the actuator, wherein a tank is hydraulically connected to the actuator with the aid of a second control valve, and a control unit is provided which opens the first control valve to generate a braking torque to supply the actuator with hydraulic fluid and simultaneously controls the second control valve which for smoothing the pressure fluctuations occurring during the operation of the pump;

wherein the pressure accumulator stores a maximum pressure, which is lower than the pressure needed at the hydraulic actuator for fully decelerating the vehicle, and has a maximum hydraulic volume, which is smaller than the volume needed for completely filling the hydraulic actuator; and wherein the drive device is an electric motor configured to drive the pump for supplying hydraulic fluid to the actuator during a braking period, and the pump fills the pressure accumulator during an overrun of the electric motor following the braking period, wherein the wheel brake cylinder is connected to the chamber via another pump, wherein in an antilock mode, the another pump pumps the hydraulic fluid into the chamber, and wherein the pump and the another pump are both operated by the electric motor.

10. The method as recited in claim 9, wherein to generate a maximum braking torque, the control unit controls the first control valve and the pump so that, at the end of a pressure build-up phase, the pump generates a larger portion of the hydraulic fluid pressure present in the chamber, and wherein a smaller portion of the pressure is generated by the pressure accumulator.

11. The method as recited in claim 9, wherein to generate a maximum braking torque, the control unit controls the first control valve and the pump so that, at the end of a pressure build-up phase, the pump generates a larger portion, which is more than 50%, of the hydraulic fluid pressure present in the chamber, and wherein a smaller portion, which is less than 50%, of the pressure is generated by the pressure accumulator.

12. The method as recited in claim 9, wherein to generate a maximum braking torque, the control unit controls the first control valve and the pump so that, at the end of a pressure build-up phase, the pump generates a larger portion, which is more than 70%, of the hydraulic fluid pressure present in the chamber, and wherein a smaller portion, which is less than 30%, of the pressure is generated by the pressure accumulator.

13. The method as recited in claim 9, wherein the pressure accumulator supports the pump, including during starting of the pump when the pump is not yet fully functional, and wherein a main contribution of the pressure build-up comes from the pump and the pressure accumulator only provides a minor contribution of the pressure build-up.

14. A power-assisted braking system for a vehicle, comprising:
- a brake master cylinder having a chamber, which is hydraulically connected to a wheel brake cylinder for braking a wheel of the vehicle;
- a hydraulic actuator which activates a piston of the brake master cylinder to pressurize hydraulic fluid in the chamber, wherein the hydraulic actuator is a brake booster, which boosts a force mechanically exerted by the driver on the piston of the brake master cylinder;
- a pressure accumulator, which stores hydraulic fluid under pressure and supplies it to the actuator for activating the piston of the brake master cylinder;
- a pump which supplies hydraulic fluid to the pressure accumulator from a tank; and
- a drive device which drives the pump;
- wherein the pressure side of the pump is hydraulically connected to a first control valve and the pressure accumulator, and the first control valve is further hydraulically connected to the actuator;
- wherein the pressure accumulator stores a maximum pressure, which is lower than the pressure needed at the hydraulic actuator for fully decelerating the vehicle, and has a maximum hydraulic volume, which is smaller than the volume needed for completely filling the hydraulic actuator;
- wherein the tank is hydraulically connected to the actuator with the aid of a second control valve, and a control unit is provided which opens the first control valve to generate a braking torque to supply the actuator with hydraulic fluid and simultaneously controls the second control valve which for smoothing the pressure fluctuations occurring during the operation of the pump; and
- wherein the drive device is an electric motor configured to drive the pump for supplying hydraulic fluid to the actuator during a braking period, and the pump fills the pressure accumulator during an overrun of the electric motor following the braking period, wherein the wheel brake cylinder is connected to the chamber via another pump, wherein in an antilock mode, the another pump pumps the hydraulic fluid into the chamber, and wherein the pump and the another pump are both operated by the electric motor.

15. The braking system as recited in claim 14, wherein the pressure accumulator stores a pressure, which is 5% to 30% lower than the pressure needed at the actuator for fully decelerating the vehicle, and contains a maximum hydraulic volume which is 5% to 30% smaller than the volume needed for completely filling the actuator.

16. The braking system as recited in claim 14, wherein the pump fills the pressure accumulator during a braking system function test period.

17. The braking system as recited in claim 14, further comprising:
- a control unit, which controls at least one of a first control valve, a second control valve, and the drive device of the pump for generating a maximum braking torque in such a way that, at the end of the pressure build-up phase, the pump generates most of the hydraulic fluid pressure at the actuator.

18. The braking system as recited in claim 14, wherein the pressure accumulator supports the pump, including during starting of the pump when the pump is not yet fully functional, and wherein a main contribution of the pressure build-up comes from the pump and the pressure accumulator only provides a minor contribution of the pressure build-up.

* * * * *